US006888084B1

(12) United States Patent
Bayer

(10) Patent No.: US 6,888,084 B1
(45) Date of Patent: May 3, 2005

(54) METHOD AND DEVICE FOR SORTING PARCELS

(75) Inventor: Thomas Bayer, Radolfzell (DE)

(73) Assignee: Siemens Aktiengesellschaft, München (DE)

(*) Notice: Subject to any disclaimer, the term of this patent is extended or adjusted under 35 U.S.C. 154(b) by 302 days.

(21) Appl. No.: 10/089,554

(22) PCT Filed: Aug. 8, 2000

(86) PCT No.: PCT/DE00/02644

§ 371 (c)(1), (2), (4) Date: Apr. 1, 2002

(87) PCT Pub. No.: WO01/23108

PCT Pub. Date: Apr. 5, 2001

(30) Foreign Application Priority Data

Sep. 30, 1999 (DE) .......................................... 199 47 259

(51) Int. Cl.[7] .............................. B07C 5/01; G06K 9/01

(52) U.S. Cl. ........................ 209/584; 209/900; 700/225

(58) Field of Search ................................ 209/584, 900; 700/115, 214, 225, 226

(56) References Cited

U.S. PATENT DOCUMENTS 5,031,223 A * 7/1991 Rosenbaum et al. ........ 382/101
5,043,908 A * 8/1991 Manduley et al. .......... 700/227
5,421,464 A 6/1995 Gillmann et al.
6,208,910 B1 * 3/2001 Michael et al. ............. 700/225
6,279,750 B1 * 8/2001 Lohmann .................... 209/559
6,510,992 B2 * 1/2003 Wells et al. ................ 235/385
6,601,847 B2 * 8/2003 Hendrickson et al. ...... 271/302

FOREIGN PATENT DOCUMENTS

| | | |
|---|---|---|
| DE | 40 00 603 | 7/1991 |
| EP | 0 844 029 | 5/1998 |

* cited by examiner

*Primary Examiner*—Donald P. Walsh
*Assistant Examiner*—Jonathan R. Miller
(74) *Attorney, Agent, or Firm*—Jacob Eisenberg; Siemens AG

(57) ABSTRACT

The invention relates to sorting items of mail in a plurality of sorting passes. In order not to have to read the address in each sorting pass and also not to have to print any machine-readable identification code on each item of mail, features characteristic of the items of mail are additionally determined during the first sorting pass and are stored together with distribution codes determined in the reading process. During the subsequent sorting passes only the characteristic features of the items of mail are measured and compared with the stored features. In the event of agreement, the item of mail is assigned the associated distribution code. A particular feed regime with defined orders ensures that in each case only n items of mail have to be compared, where n=maximum multiple delivery rate to be expected.

12 Claims, 3 Drawing Sheets

METHOD AND DEVICE FOR SORTING PARCELS

The invention relates to a method of sorting items of mail in accordance with the preamble of claim 1 and to an apparatus for implementing the method.

It is a significant task of sorting systems for items of mail to extract the address information on an item of mail, in order to be able to assign the latter ultimately a distribution code (receiver). As a rule, the number of possible distribution codes exceeds the number of sorting endpoints, so that an item of mail has to be sorted in a plurality of stages, that is to say passes repeatedly through a sorting machine.

In the first pass, the sorting information is extracted from the image of the item of mail, by an address reading system (OCR) being used first. The items of mail which are rejected by the automatic reading system are encoded manually (video coding). The sorting information obtained in the process has to be maintained for the subsequent sorting process, in particular in order not to have to encode the rejected items of mail manually and therefore to encode them in a complicated manner in subsequent sorting passes. As a rule, a code is applied to the item of mail, which can simply be read automatically. This contains either the sorting information in explicit form or represents a code which identifies the item of mail unambiguously. In this case, in the first pass, the code must be stored in a database together with the sorting information, so that the latter can be derived via the code from the database in subsequent sorting passes.

However, the application of this code is not feasible in all post sorting applications; in particular in applications for the sorting of in-house post, this is not possible, since a large part of the items of mail internal mail envelopes—are used repeatedly with different recipient addresses. In this connection, a solution for the temporary storage of objects, such as letters or the like, in a reading system is, known, in which discriminating features are additionally determined from the objects to be read before the temporary storage and, assigned to the relevant reading results, are stored in a database (DE 40 00 603 C2). When the objects leave the intermediate store again, the information to be detected is not read again, instead the discriminating features (fingerprints, as they are known) are recorded, compared with the stored features and, in the event of agreement between the features and a stored feature set, the associated reading result is assigned to the respective object. The application of this method to real sorting processes is generally extremely difficult, however, since here an item of mail from a very large quantity has to be recognized again reliably, for example from several 100 000 objects. Furthermore, the scanned images from two different letters are in the extreme case distinguished only by a few pixels (if this is information post, and the addresses are distinguished only in one letter of the forename); on the other hand, two image recordings from the same object may differ by considerably more pixels.

The object of the invention is, therefore, in the case of multi-stage sorting processes, to avoid repeatedly reading the addresses of each item of mail and printing on machine-readable identification codes, by, the items of mail being identified by means of a comparison of features of as few items of mail as possible during the subsequent sorting passes.

According to the invention, the object is achieved by the teaching specified in claim 1 and 5. As a result of building up a database in which, for each item of mail, in addition to the distribution information/distribution code read and the feature sets, the order of reading the distribution information and the associated sorting endpoint number and/or the number of the container in which the item of mail is stored in this sorting pass is contained, it is possible to subdivide the database into sections associated with the containers. In the, database sections, the data are ordered in accordance with the order of reading. During the second or subsequent sorting pass, the items of mail from each container of the previous sorting pass are input again into this or another sorting machine in the order in which they were stored in the container. With the reporting of the endpoint or container number, the corresponding database sections which are needed for the current identification are identified. Because of the defined and known order of the items of mail only a comparison of the parameter sets from at least n items of mail, where n=the maximum multiple delivery rate to be expected, is needed in order to identify the items of mail and the distribution code. This is carried out by the parameter set of the first item of mail being compared with the first n parameter sets of the relevant database section, the parameter set of the second item of mail being compared with n parameter sets arranged one after another, beginning with the parameter set of the second item of mail, and so on. Since only one comparison between few parameter sets has to be carried out, the result is significantly more secure with a lower outlay.

Advantageous refinements of the invention are presented in the subclaims.

If the containers belonging to a specific sorting endpoint and filled with items of mail are not identified in accordance with the sequence: in which they are filled, then, advantageously, the last item of mail before or the first item of mail after each sorting endpoint emptying is additionally identified in the database. In order to determine the database section that is relevant for the respective container, the feature set of the first item of mail of each container from this sorting endpoint is then compared with the first feature sets of the database sections that are associated with this sorting endpoint but has not yet been processed in this sorting path, until agreement is determined.

It is also advantageous, in particular when implementing the second and further sorting runs on other sorting machines than on the sorting machine of the first sorting pass, to store the contents of the database section in memories which can be read in and out are fitted to the relevant containers, which are read out before the items of mail are put into the sorting machines for the second and further sorting passes and are put into the control systems of these sorting machines.

A further advantageous embodiment in this connection is the electronic transfer of the relevant database contents to the sorting machines carrying out the second and further sorting sequences.

The invention will be explained in more detail below in an exemplary embodiment and using the drawing, in which.

Figure 1:
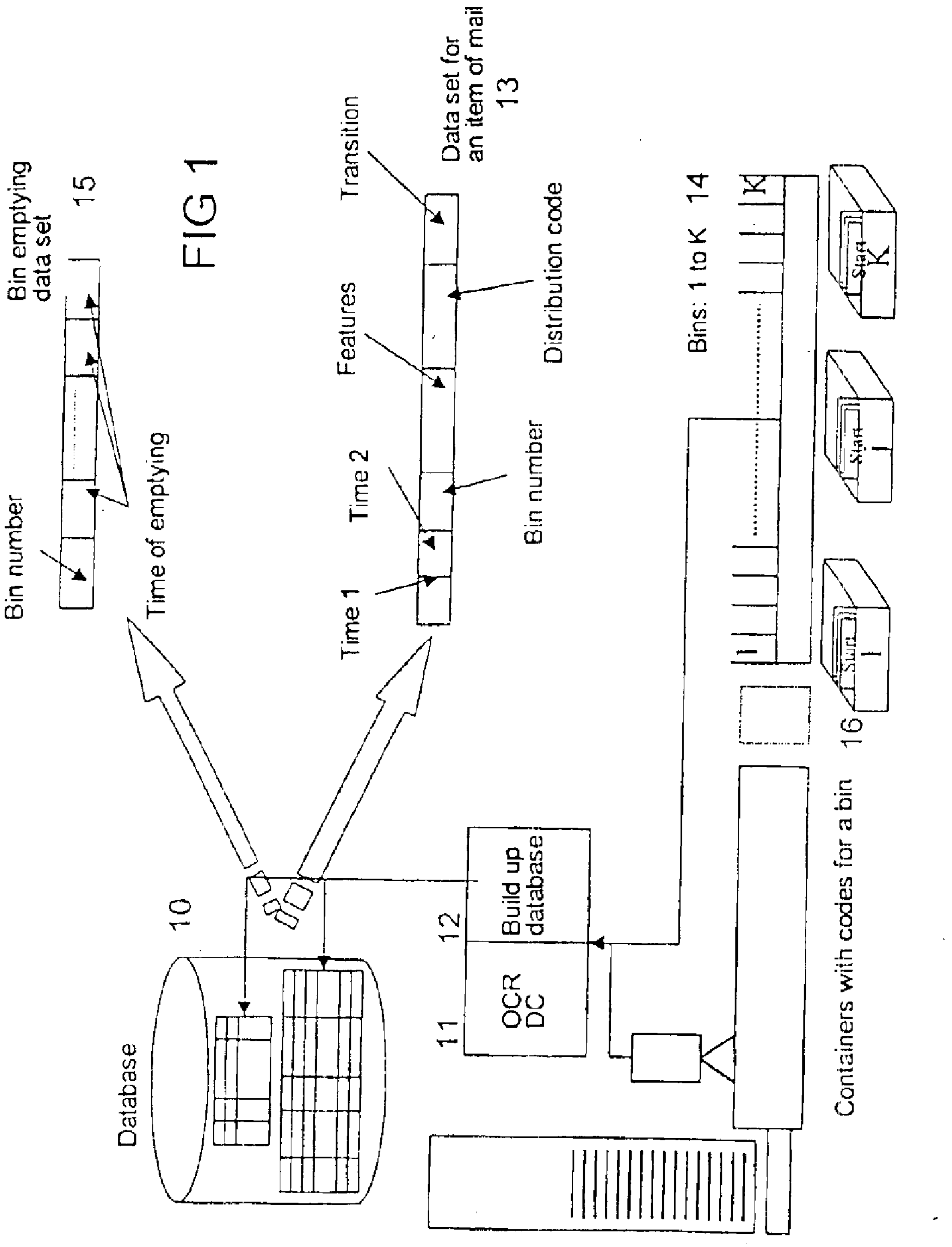
FIG. 1 shows a schematic representation of the sequence during the first sorting pass.
Figure 2:
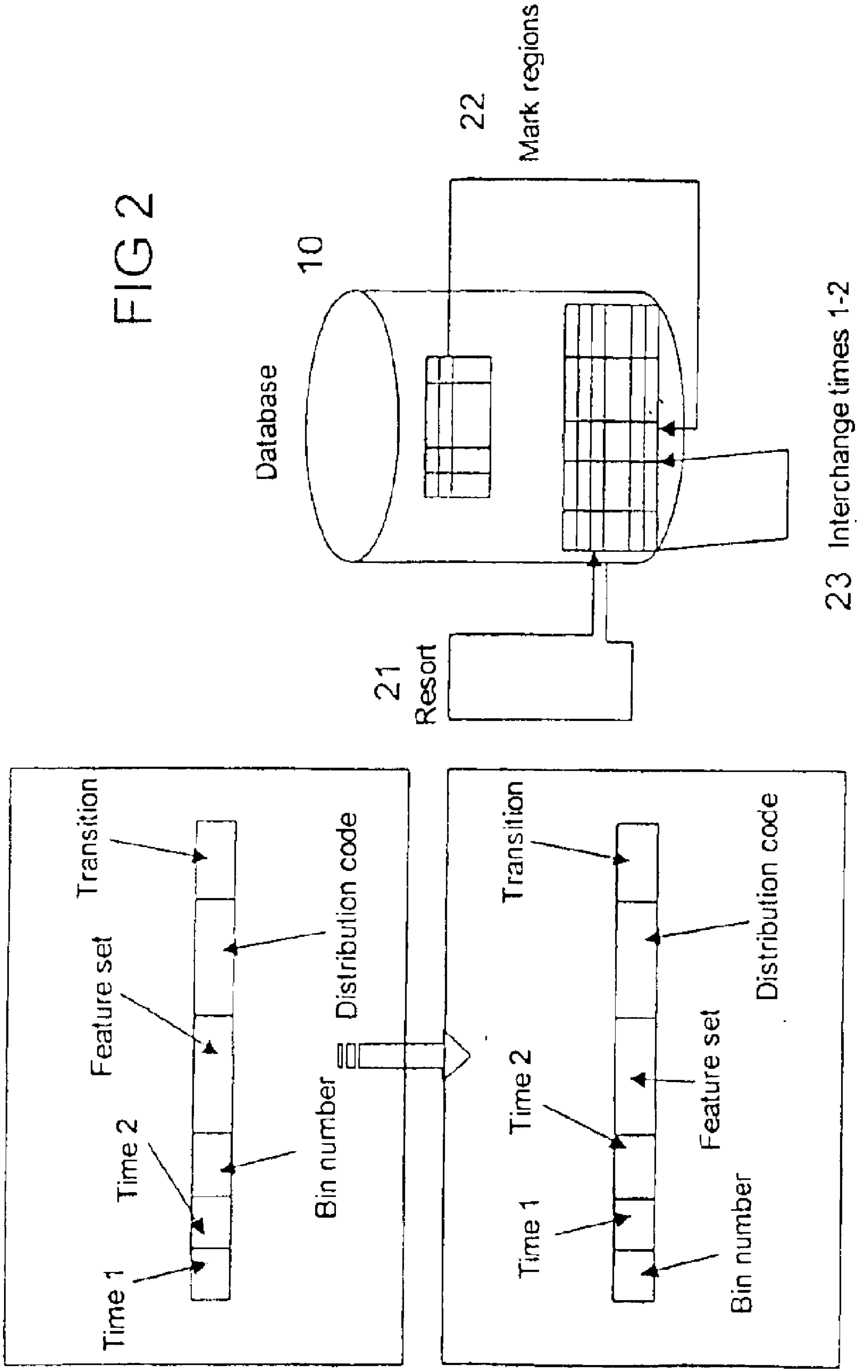
FIG. 2 shows a schematic representation of the following database processing.

The sorting machine has, as sorting endpoints, sorting bins 14, which have to be emptied at a specific level.

During the first sorting pass, the addresses of the items of mail and therefore the distribution code are read 11, either automatically by an address reader or manually by video encoding staff. In order to enable access simply to this information in following sorting passes, in parallel with the reading process, a database is built up 12, which contains data sets 13 for items of mail for characteristic features relating to all items of mail that have been processed. In detail, the data set 13 of an item of mail contains:

the feature set/fingerprint features the distribution code the sorting bin number j and/or the number of the container 16 for temporary storage, into which the item of mail has been sorted the time at which an item of mail was read a marking as to whether the item of mail represents the last object in a container as a temporary store.

The first input is used for the reidentification of an item of mail in subsequent sorting passes, the second input contains the distribution code for this item of mail. The remaining inputs permit a reduction in the quantity of items of mail for the subsequent reidentification.

The fingerprint features take into account two different aspects, firstly characteristics of letterbox post, and secondly the characteristics of post from large distributors. Letterbox post may in most cases already be distinguished by the geometric dimensions and simple global image features. In the case of large distributors, the letters are distinguished only in terms of the address, the dimensions and layout are identical for all the items of mail. Consequently, two different feature structures are calculated and stored in relation to an item of mail:

Holistic features of the item of mail; such as height, width, grey value distribution on a scanned image of the item of mail, position of the recipient's address, etc.

Features of the recipient's address: number of lines, number of words in a line, number of characters in a line, etc.

The sorting machine distributes each item of mail supplied to it into a sorting bin 14. As a rule, the buffer capacity of a sorting bin 14 is not sufficient for the items of mail to be processed in one sorting path, so that the items of mail have to be stored temporarily in containers 16, for example in troughs, before these can be supplied to a subsequent sorting process. When transferring the items of mail from a sorting bin 14 into a temporary store 16, the order of the items of mail must be maintained. Furthermore, for each container 16 the information must be available as to which items of mail correspond to which sorting bin 14 which contains them. For example, the correspondence between container and sorting bin number can be produced by means of an attached docket (plain text or bar code), which is fixed to the container. Furthermore, a card can optionally be inserted into each container 16—at the start or at the end—(identified by start in FIG. 1), which may simply be identified automatically in a subsequent sorting pass. It is beneficial (but not necessary) for the order in the container (or of the filling) is known, so that this information can be used for the subsequent sorting pass.

In addition to the features and the sorting code, the time at which an item of mail was read in the sorting machine is stored in the database 10 and, also the sorting bin 14 and/or container 16 to which this item of mail has passed for temporary storage. In; addition, the sorting machine reports to the database 10, via the machine control system, the time and the sorting bin number at which this sorting bin 14 has been emptied 15. However, this information is only necessary when the order of the containers 16 for the temporary storage for a sorting bin 14 cannot be recorded for the subsequent sorting pass.

After a complete sorting pass, the database 10 contains all the items of mail in the chronological order in which they were supplied to the sorting machine. The database objects are then resorted 21 in accordance with the sorting bin 14 (primary key) and, within a bin, in accordance with the time (secondary key) at which the distribution address was read. Furthermore, the database inputs from a sorting bin 14 are marked in the transition element 22, whose time stamp corresponds with the time at which a bin content was emptied into a container 16, if this information has been stored during the first pass. This marking consequently subdivides the amount of items of mail from one sorting bin 14 into a number of part amounts which corresponds exactly to the number of containers 16 set up for temporary storage.

The database 10 is then distributed to the sorting machines on which the items of mail are sorted again. It is beneficial not to transmit the complete database 10 but only the database regions which correspond to the items of mail which are processed there.

Figure 3:
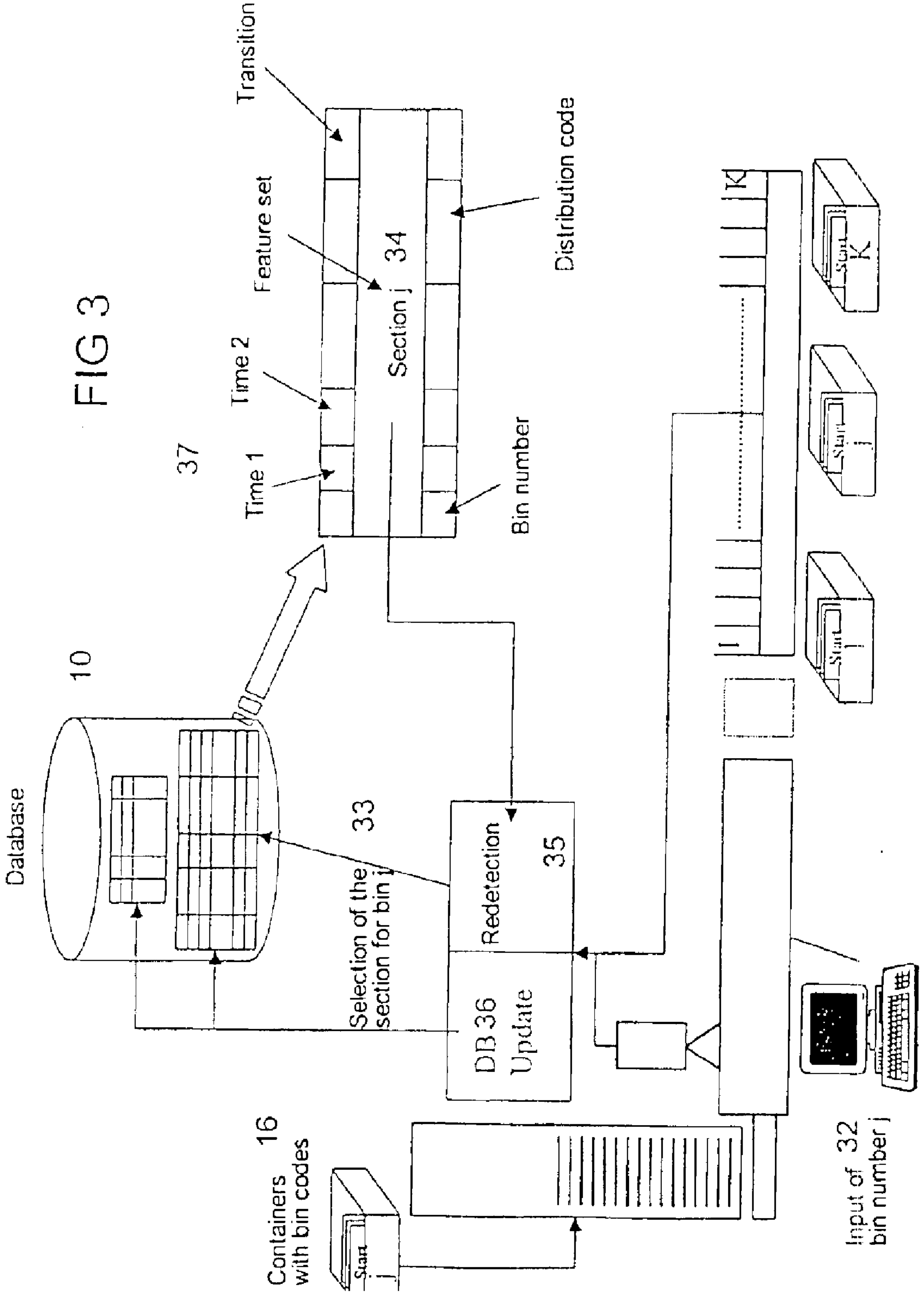
FIG. 3 shows a schematic representation of the sequence during the ith sorting pass (i>1).

In the sorting passes 2 and thereafter (FIG. 3), the items of mail from the containers 16 are supplied to the sorting machine in a predefined order with respect to the sorting bin number. The sequence of the bin numbers, and therefore the order of supplying the containers, can be equated with the order of the data sets in the database 10 in different ways:

The order of the sorting bin numbers is predefined by the control computer via the user interface.

The operating staff input the number via an input field.

The number is input with a reading unit via a bar code (docket accompanying the container).

As a result of the input 32 of the sorting bin number j, the corresponding database group 34 is selected 33. The determination of the database section which corresponds with the items of mail supplied to the respective container 16 for the sorting bin j requires closer consideration. Three cases are distinguished:

1. The sorting bin j was stored in precisely one container.
2. The sorting bin j was stored in m containers. The order of these m containers correspond to the order in which they were filled.
3. The sorting bin j was stored in m containers. The order of these m containers does not correspond to the order in which they were filled.

In the first case, the database section corresponding to this container is identical to the selected database group. In the second case, the order of the items of mail supplied likewise corresponds to the order of the items of mail in the database 10.

If the containers 16 are not supplied in the original order—the third case—the database section which corresponds to the content of the current container 16 must be determined. In this case, the information in the "transfer" field and, optionally, the start card belonging to each container are used for this sorting bin. The start card indicates that a new container 16 begins and, therefore, in turn a corresponding database section must be determined. Since, by means of the "transition" element, the amount of items of mail in the sorting bin 14 has been divided into exactly as many parts as containers 16 have been provided, it is possible to use for the selection the first, n=5 items of mail from each part amount which have not yet been processed. The current item of mail therefore: has to be compared with all these objects and checked for correspondence. The part amount forms the corresponding database section, whose starting object has a fingerprint identical to the current image of the item of mail.

The distribution code of an item of mail to be sorted is determined by comparing the fingerprint 35 with the five first database entries of the relevant database section. Each time there is successful correspondence, from this point on the next five database entries are compared with the next image of an item of mail. The number of the amount of items of mail selected, five in this case, must be greater than the maximum multiple delivery rate to be expected.

In each sorting pass, the database 10 is brought to the most recent state 36 if sorting subsequently has to be continued. For this purpose, for each object processed, the elements "bin number" and "time 2" are provided with the appropriate new values. Likewise, the "transition" element is deleted, and the bin emptying data set is overwritten, if both are in use. Before the database 10 is resorted for the subsequent sorting pass 21 and 22, the contents of the two fields "time 1" and "time 2" are interchanged at 23.

As an alternative to the proposed central database solution, the storage of the fingerprint features and of the distribution code can likewise be carried out via electronic memory modules, which are fixed directly to the containers 16, and therefore make this data available decentrally, exactly at the point at which it is needed. For example, stickers with semiconductor memories can be used which, after the container 16 has been filled, are loaded with the information relating to the fingerprint features and the distribution code and are fixed directly to this container 16. During subsequent sorting passes, the content of the sticker is read out before it is fed into the sorting machine, and the fingerprint comparison 35 is carried out. The beginning of this stack is detected via the start card.

What is claimed is:

1. A method of sorting items of mail by means of sorting machines with sorting endpoints, which comprise sorting bins (14) or replaceable containers (16), in multiple sorting passes, the surface of the item of mail with a distribution address being recorded and read during each first sorting pass, characterized in that during the first sorting pass, characteristic features of the item of mail or features of the address are additionally determined for each item of mail as a defined character feature set of features for distinguishing at least n items of mail, where n=a maximum multiple delivery rate, when a defined level is reached in each sorting endpoint, the container (16) is changed or the sorting bin (14) is emptied and the items of mail emptied out are storied temporarily in containers (16) while maintaining the items of mail order, the containers (16) being identified at least with a sorting endpoint number, for each item of mail, an order of reading ta distribution address, the associated sorting endpoint number and/or the number of the container (16) in which the item of mail is stored in this sorting pass, a distribution code determined from the address read and a characteristic feature set are stored in a database (10), in a second and each further sorting pass, the items of mail from each container (16) from the respective previous sorting pass are put into this or another sorting machine in the order in which the items of mail were stored in the container (16), an associated endpoint or container number is reported to a sorting machine and therefore the database section relevant to the respective container (16) is determined, the data in each database section being ordered in accordance with the order of reading the distribution address, for each item of mail the defined characteristic feature set is determined, with the aid of which the respective distribution code is then determined, by the characteristic feature set of lea first item of mail being compared with n characteristic feature sets stored one after another in this database section, beginning with the feature set of the first item of mail, and, if there is agreement within a defined range, the associated stored distribution code being assigned to the first item of mail, by the characteristic feature set of the second item of mail being compared with n characteristic feature sets stored one after another in this database section, beginning with the feature set of the second item of mail, and, if there is agreement, the stored distribution code for the feature set being assigned to the second item of mail, and the method of sorting items is repeated until the feature sets of all the items of mail supplied have been compared with the associated stored feature sets.

2. The method as claimed in claim 1, characterized in that if an order of the containers (16) belonging to a sorting endpoint has not been identified, in order to detect the transition from one container (16) to an other, in addition a respective last item of mail before or a first item of mail after each sorting endpoint emptying is identified in the database (10), and the feature set of the first item of mail of each container (16) of one sorting endpoint in each case is compared with the first n feature sets of the database sections associated with this sorting endpoint but not yet processed in this sorting pass until agreement, and therefore the database section associated with the items of mail in this container (16), have been determined.

3. The method as claimed in claim 1, characterized in that the contents of the database sections are stored in memories which are fitted to relevant containers (16) and which can be written to and read from said memories being read out before the items of mail are put into the sorting machines for the second and further sorting passes and being put into the control systems of sorting machines.

4. The method as claimed in claim 1, characterized in that the relevant database contents are transmitted electronically to the sorting machines carrying out the second and further sorting passes.

5. The method as claimed in claim 1, characterized in that the contents of database sections are stored in memories which are fitted to the relevant containers (16) and which can be written to and read from, said memories being read out before the items of mail are put into the sorting machines for the second and further sorting passes and being put into the control systems of sorting machines.

6. The method as claimed in claim 1, characterized in that the relevant database contents are transmitted electronically to the sorting machines carrying out the second and further sorting passes.

7. The method as claimed in claim 1, characterized in that if an order of the containers (16) belonging to a sorting endpoint has not been identified in order to detect the transition from one container (16) to an other, in addition a respective last item of mail before or a first item of mail after each sorting endpoint emptying is identified in the database (10), and the feature set of the first item of mail of each container (16) of one sorting endpoint in each case is compared with the first n feature sets of the database sections associated with this sorting endpoint but not yet processed in this sorting pass until agreement, and therefore the database section associated with the items of mail in this container (16), have been determined.

8. The method as claimed in claim 1, characterized in that the contents of the database sections are stored in memories which are fitted to relevant containers (16) and which can be written to and read from, said memories being read out before the items of mail are put into the sorting machines for the second and further sorting passes and being put into the control systems of sorting machines.

9. The method as claimed in claim 1, characterized in that relevant database contents are transmitted electronically to the sorting machines carrying out the second and further sorting passes.

10. The method as claimed in claim 1, characterized in that the contents of database sections are stored in memories which are fitted to relevant containers (16) and which can be written to and read from, said memories being read out before the items of mail are put into the sorting machines for the second and further sorting passes and being put into the control systems of sorting machines.

11. The method as claimed in claim 1, characterized in that relevant database contents are transmitted electronically to the sorting machines carrying out the second and further sorting passes.

12. A method of sorting items of mail by means of sorting machines with sorting endpoints, which comprise sorting bins (14) or replaceable containers (16), in multiple sorting passes, the surface of the item of mail with a distribution address being recorded and read during each first sorting pass, characterized in that during the first sorting pass, characteristic features of the item of mail and features of the address are additionally determined for each item of mail as a set of features for distinguishing at least n items of mail, where n=a maximum multiple delivery rate, when a defined level is reached in each sorting endpoint, the container (16) is changed or the sorting bin (14) is emptied and the items of mail emptied out are stored temporarily in containers (16) while maintaining the items of mail order, the containers (16) being identified at least with a sorting endpoint number, for each item of mail, an order of reading a distribution address, the associated sorting endpoint number and/or the number of the container (16) in which the item of mail is stored in this sorting pass, a distribution code determined from the address read and a characteristic feature set are stored in a database (10), in a second and each further sorting pass, the items of mail from each container (16) from the respective previous sorting pass are put into this or another sorting machine in the order in which the items of mail were stored in the container (16), an associated endpoint or container number is reported to a sorting machine and therefore the database section relevant to the respective container (16) is determined, the data in each database section being ordered in accordance with the order of reading the distribution address, for each item of mail the defined characteristic feature set is determined, with the aid of which the respective distribution code is then determined, by the characteristic feature set of a first item of mail being compared with n characteristic feature sets stored one after another in this database section, beginning with the feature set of the first item of mail, and, if there is agreement within a defined range, the associated stored distribution code being assigned to the first item of mail; by the characteristic feature set of the second item of mail being compared with n characteristic feature sets stored one after another in this database section, beginning with the feature set of the second item of mail, and, if there is agreement, the stored distribution code for the feature set being assigned to the second item of mail, and the method of sorting items is repeated until the feature sets of all the items of mail supplied have been compared with the associated stored feature sets.

* * * * *